Figure 1:
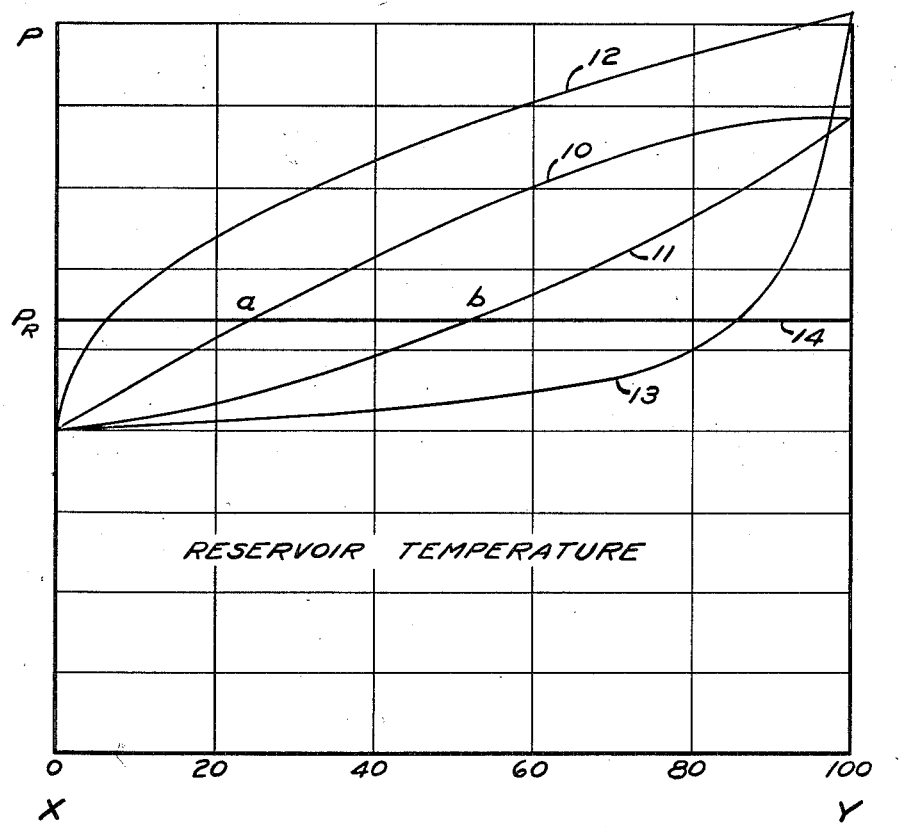

United States Patent Office 2,822,872
Patented Feb. 11, 1958

2,822,872

RECOVERY OF OIL FROM RESERVOIRS

Michael J. Rzasa and Paul L. Terwilliger, Tulsa, Okla., assignors to Pan American Petroleum Corporation, a corporation of Delaware Application May 10, 1954, Serial No. 428,476

2 Claims. (Cl. 166—9)

This invention relates to processes for increasing the recovery of oil from reservoirs. More specifically, this invention pertains to methods of recovery of substantially all of the oil in the formation by displacement with more volatile hydrocarbons. As such, it constitutes an improvement over the invention of patent application Serial Number 176,168 filed in the name of Richard A. Morse.

As is discussed in that application, the recovery of oil from subterranean reservoirs by the natural forces available initially in the reservoir or by water drive, gas drive, gravity drive and the like is sufficient to produce only part of the total hydrocarbons present initially in the reservoir and frequently this part may be as low as 15 to 25 percent of the oil in place. On the other hand, by the processes disclosed in the above-identified patent application, it is possible to obtain substantially all of the oil in the formation. This is accomplished by the use of a miscible solvent, that is, a material which is soluble in oil and also in a scavenging fluid. Typical examples of the miscible fluid include, for example, materials now generally called "L. P. G.," that is, liquefied petroleum gas. L. P. G., as is well known, consists principally of propane and butane with minor proportions of pentane and a very small amount normally of ethane. There may be present traces of hexane and heavier hydrocarbons. In using the process, without going into details, the miscible solvent is introduced through an input well into the formation and builds up a solvent bank therein, the forward edge of which dissolves in the oil and forms therewith a solvent-oil transition zone. This miscible solvent is in turn displaced by a scavenging fluid, for example, natural gas, which is introduced into the input well at such a pressure that it causes the solvent to flow through the formation ahead of it. The solvent and scavenging fluid again form a transition zone. The solvent, therefore, will force the oil ahead of it to a producing well. Generally, the amount of L. P. G. injected is in the range of about 3 to about 10 percent, typically 5 percent, of the pore volume of the reservoir. This furnishes sufficient solvent to maintain a relatively pure solvent zone between the two transition zones above described. Continued injection of the scavenging gas eventually drives the oil and then the solvent to the producing well. Preferably, the pure solvent bank nearly disappears at the point of maximum circumferential length of the transition zone. The complete removal of the solvent can be effected by reducing the pressure on the reservoir and thus permitting the solvent to volatilize and be removed as a gas. Most of the solvent can, however, be recovered as a liquid under higher reservoir pressures at the completion of the expulsion of the oil from the zone.

Experimentally, it has been determined that this miscible fluid drive is satisfactory to produce substantially all of the oil in the reservoir and after passage of the scavenging fluid there are substantially no hydrocarbons other than residual L. P. G. and scavenging fluid in the pores of the reservoir rock. Even this residual L. P. G. is small—about 5 to 20 percent of the pore volume.

Experiments with this process have shown that the lengths of the transition zones are a function of the reservoir temperature and the pressure maintained on the system and the mutual solubility of adjacent fluids. In general, given particular fluids, since the reservoir temperature is fixed, the significant variable is the pressure maintained on the solvent. At fairly high pressures, generally upwards of a thousand pounds per square inch, it is found that the length of this transition zone is short, whereas at lower pressures this transition zone tends to increase rapidly in length and with time. On the other hand, it is desirable to operate under low rather than high reservoir pressures simply to avoid high compression costs, particularly in low-pressure fields. When operating under such conditions, the length of the oil-solvent transition zone and the scavenging fluid-solvent transition zone, particularly the latter, may grow to such an extent that it is necessary to introduce a great deal more solvent than is economically desirable.

We have found that it is possible to operate very satisfactorily at pressures substantially lower than those considered ideal for the invention disclosed in the above application by interposing between the body of miscible solvent, say L. P. G., and the displacing gas which typically will be a natural gas or a gas containing over 80 percent methane, a material which is in itself a gas at reservoir pressure and temperature. This material is characterized additionally as being soluble in the miscible solvent and as having at reservoir temperature and pressure a narrow two-phase region when mixed in varying concentrations with material of the type forming the body of miscible solvent used.

This can be better described with reference to the accompanying Figure I, which is called a pressure-composition diagram. On this diagram there is plotted vertically pressure on a system consisting essentially of two mutually soluble constitutents which can be called X and Y. The percent of the second material Y in the total composition is plotted at the base of the diagram. The upper curve marked 10 is the so-called bubble point line, while the lower curve marked 11 is the dew point line. Such a diagram is made from experiments in which the two constituents X and Y are mixed in a predetermined composition, bringing the constituents to a given temperature (Figure I is for materials at one temperature only), and varying the pressure on the materials from a high value to a low value, noting the pressure at which the first bubble of gas forms, which is plotted on curve 10, and the pressure at which substantially the entire mixture becomes gaseous, which is plotted on curve 11. A number of determinations of this sort at varying compositions of the constituents X and Y provide sufficient points to determine the diagram shown. This is additionally discussed on page 80 and following of the book, "Volumetric and Phase Behavior of Hydrocarbons" by Bruce Sage and William Lacy, Stanford University Press, 1939. The pressure-composition diagram of various materials varies widely. Thus, for example, curves 10 and 11 give the bubble point and dew point curves for a mixture of two specific components. Corresponding curves 12 and 13 give the same characteristics for mixtures of another set of two different materials.

It is apparent that the shape of the envelope of the curves connecting the bubble point and dew point lines is a function of the temperature, the materials forming the mixture, and the relative composition of the components of the mixture. Some materials have a narrow two-phase region as shown by curves 10 and 11. Others have a wide two-phase region as shown by curves 12 and 13. Quantitatively, a "narrow two-phase region" can be defined by considering a horizontal line such as line 14 which is, therefore, a line of constant pressure. If the distance between points *a* and *b* where this line 14 intercepts the bubble point line 10 and the dew point line 11, respectively, is not substantially more than one-quarter of the length of line 14 where line 14 has been drawn at a pressure corresponding to the reservoir pressure Pr, the mixture has a narrow two-phase region.

In this invention, material X can be, for example, the miscible solvent referred to in the Morse invention and more particularly is preferably at least one of the hydrocarbons propane, butane, and pentane. The second material Y is a material which has been already stated to be introduced into the reservoir after the miscible solvent. When this material has a narrow two-phase region (as above defined) when mixed in varying concentrations with the hydrocarbon solvent, it follows that when used in the reservoir, a rapid shift occurs at any point from all liquid solvent to all gaseous following material. This gas may then in turn be displaced by a less expensive scavenging gas, for example, a gas containing over 80 percent methane, typically natural gas. The transition zone between miscible solvent and material following this solvent is both narrow in length and changes rapidly in composition from all liquid to all gas. Under these conditions, it is possible to operate with much narrower transition zones than is generally true when following the teachings of the Morse invention, or to operate at much lower pressures for equivalent lengths of such zones. Accordingly, it is possible to operate with a much lower compression cost. For example, it is usually desirable to operate at a pressure above 650 to 800 pounds per square inch when using the Morse invention, whereas with the improvement constituting the basis of our invention, it is possible to operate at pressure of the order of 100 to 400 pounds, typically, 200 pounds per square inch. In this process, there is a continual shift from all liquid solvent following the oil through a mixture of two phases of varying composition to a mixture which exists below its lower dew point and is, therefore, a gas at reservoir temperature. This particular material in turn, being driven by a scavenging gas, can be completely removed from the reservoir.

Materials which have been found particularly advantageous for use in this process are those which, as discussed above, are in themselves gaseous at reservoir temperature and pressure, soluble in the miscible solvent (typically, L. P. G.), and have a narrow two-phase region when mixed in varying concentrations with the miscible solvent of the type used in the reservoir. Examples of such materials which can be very satisfactorily used with a miscible solvent such as L. P. G. will be apparent to those having knowledge of the phase behavior of hydrocarbons and equivalent materials. We suggest, without limitation, hydrocarbons more volatile than those of the miscible solvent, for example, ethane (or propane, if the miscible solvent contains little propane), carbon dioxide, nitrous oxide, mixtures of nitrous oxide and carbon dioxide, and mixtures of nitrous oxide and ethane. In the case of the mixtures of carbon dioxide and nitrous oxide, we prefer to use primarily those with a high weight percent carbon dioxide, which, as is known, form azeotropes at certain pressure and temperatures. The critical locus curve thus has a reversal wherein those high weight percent carbon dioxide mixtures have their critical temperatures below the critical temperatures of either carbon dioxide or nitrous oxide. In the case of mixtures of nitrous oxide and ethane, we would prefer to use a mixture of approximately equal weight percentages of nitrous oxide and ethane. It is to be understood, however, that this invention is not limited to the specific materials that have been disclosed.

When the material is carbon dioxide, or in general is non-explosive, it is not necessary to use natural gas or the like as a scavenging gas, and less expensive oxygen-containing gas, e. g., air, can be used. Flue gas could also be used.

When using this invention, it will be found that from a quarter to a half or more of the amount of miscible solvent which would otherwise have to be employed need not be used, and further it will be found that satisfactory operations can be achieved at typically considerably lower pressures than would otherwise be the case.

It is to be understood that this invention is not limited to the examples which have been described and discussed. The invention is best defined by the appended claims.

We claim:

1. An improvement in recovery of oil from a subterranean reservoir under relatively low pressure comprising forcing said oil to a producing well by a body of hydrocarbon liquid consisting essentially of at least one material selected from the group consisting of L. P. G., propane, butane, and pentane, maintaining sufficient pressure on said reservoir to keep said body above its bubble point but not substantially above 400 pounds per square inch, driving said body through said reservoir by a gas containing over 80 percent methane, and placing between said body and said gas a different material only which is characterized by the following: (1) it by itself is a gas at reservoir pressure and temperature, (2) it is soluble in said body, and (3) it has at reservoir temperature and pressure a narrow two-phase region when mixed in varying concentrations with material forming said body.

2. In the method of recovering crude oil from a reservoir by gas drive, the steps comprising injecting into said reservoir a body of hydrocarbons composed essentially of at least one of the hydrocarbons propane, butane, and pentane at a pressure above but not substantially over twice the bubble point thereof under reservoir temperature, maintaining said pressure on said body of hydrocarbons by injecting thereafter into said reservoir a material which is miscible therewith but which is different from said body and from methane, which is a gas at said pressure and reservoir temperature, and which is further characterized by having at reservoir temperature and pressure a narrow two-phase region when mixed in varying concentrations with hydrocarbons of the same composition as said body, said material being selected from the group consisting of carbon dioxide, nitrous oxide, and mixtures of nitrous oxide and carbon dioxide, and maintaining pressure on said material by injection thereafter of a gas containing at least 80 percent methane.

References Cited in the file of this patent

UNITED STATES PATENTS

| 2,623,596 | Whorton et al. | Dec. 30, 1952 |
| 2,669,306 | Teter et al. | Feb. 16, 1954 |

FOREIGN PATENTS

| 849,534 | Germany | Sept. 15, 1952 |
| 696,524 | Great Britain | Sept. 2, 1953 |